(12) United States Patent
Greiner et al.

(10) Patent No.: US 12,504,517 B2
(45) Date of Patent: Dec. 23, 2025

(54) LIDAR SENSOR FOR DETECTING AN OBJECT AND A METHOD FOR A LIDAR SENSOR

(71) Applicant: Robert Bosch GmbH, Stuttgart (DE)

(72) Inventors: Alexander Greiner, Reichenbach (DE); Bernd Schmidtke, Leonberg (DE); Reiner Schnitzer, Reutlingen (DE); Siegwart Bogatscher, Leonberg (DE); Steffen Fritz, Wurmberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 923 days.

(21) Appl. No.: 17/768,584

(22) PCT Filed: Sep. 16, 2020

(86) PCT No.: PCT/EP2020/075835
§ 371 (c)(1),
(2) Date: May 12, 2022

(87) PCT Pub. No.: WO2021/073826
PCT Pub. Date: Apr. 22, 2021

(65) Prior Publication Data
US 2023/0236290 A1    Jul. 27, 2023

(30) Foreign Application Priority Data
Oct. 15, 2019   (DE) .................. 10 2019 215 813.7

(51) Int. Cl.
*G01S 7/481* (2006.01)
*G01S 17/931* (2020.01)

(52) U.S. Cl.
CPC .......... *G01S 7/4816* (2013.01); *G01S 7/4814* (2013.01); *G01S 17/931* (2020.01)

(58) Field of Classification Search
CPC .... G01S 7/4816; G01S 7/4814; G01S 17/931; G01S 7/4868; G01S 7/4863; G01S 17/42;
(Continued)

(56) References Cited

U.S. PATENT DOCUMENTS 9,360,554 B2 *   6/2016   Retterath ............... G01S 17/931
10,429,496 B2 *  10/2019  Weinberg ............... G01S 7/4865
(Continued)

FOREIGN PATENT DOCUMENTS

| CN | 101688774 A | 3/2010 |
|----|-------------|--------|
| CN | 103443648 A | 12/2013 |

(Continued)

OTHER PUBLICATIONS

Machine translation of DE102016221049 (Year: 2018).*
(Continued)

*Primary Examiner* — Seung C Sohn
(74) *Attorney, Agent, or Firm* — NORTON ROSE FULBRIGHT US LLP

(57) ABSTRACT

A LIDAR sensor for detecting at least one object in a field of view. The LIDAR sensor includes: a transmitting unit includes a laser source; and a receiving unit having at least one detector unit for receiving secondary light that has been reflected and/or scattered in the field of view by an object. The detector unit includes a sub-detector array including a plurality of sub-detectors arranged in a first direction of extent next to each other and/or in a second direction of extent one behind another, and a processor unit that is designed to select a first group from a plurality of sub-detectors and to group it to form a first macropixel, and simultaneously to select at least one second group and to group it/them to form at least one second micropixel. The first macropixel and at least one of the second macropixels comprise at least one same sub-detector.

8 Claims, 6 Drawing Sheets

(58) Field of Classification Search
CPC .......... G01S 17/04; G01S 7/481; G01S 7/484; G01S 7/486
See application file for complete search history.

(56) References Cited

U.S. PATENT DOCUMENTS

2018/0081041 A1 3/2018 Niclass et al.
2018/0341009 A1 11/2018 Niclass et al.

FOREIGN PATENT DOCUMENTS

| | | |
|---|---|---|
| CN | 105066953 A | 11/2015 |
| CN | 109387854 A | 2/2019 |
| CN | 110249239 A | 9/2019 |
| DE | 102015101902 A1 | 8/2016 |
| DE | 102016221049 A1 | 4/2018 |
| JP | 2019144186 A | 8/2019 |
| WO | 2019064062 A1 | 4/2019 |
| WO | 2019110206 A1 | 6/2019 |
| WO | 2019121437 A1 | 6/2019 |

OTHER PUBLICATIONS

International Search Report for PCT/EP2020/075835 Issued Nov. 25, 2020.
Li, et al.: "Multi-element array detecting technology of ladar," Infrared and Laser Engineering, 38(2), (2009), pp. 295-299, with English Abstract.

* cited by examiner

LIDAR SENSOR FOR DETECTING AN OBJECT AND A METHOD FOR A LIDAR SENSOR

FIELD

The present invention relates to a LIDAR sensor for detecting at least one object in a field of view of the LIDAR sensor and to a method for a LIDAR sensor for detecting an object in a field of view of the LIDAR sensor.

BACKGROUND INFORMATION

LIDAR sensors will become established in the coming years in the implementation of highly automated driving functions. At present, mechanical laser scanners for covering large horizontal detection angles of between 150° and 360° are conventional. In a first manifestation, rotating-mirror laser scanners, the maximum sensing range of which is restricted to about 120°, a motor-driven deflecting mirror rotates. For larger sensing ranges of up to 360°, all the electro-optical components are located on a motor-driven turntable or rotor.

SUMMARY

The present invention relates to a LIDAR sensor for detecting at least one object in a field of view of the LIDAR sensor. In accordance with an example embodiment of the present invention, the LIDAR sensor comprises a transmitting unit having: at least one laser source for generating and emitting primary light into the field of view; a receiving unit having at least one detector unit for receiving secondary light that has been reflected and/or scattered in the field of view by an object; and wherein the detector unit comprises a sub-detector array including a plurality of sub-detectors arranged in a first direction of extent next to each other and/or in a second direction of extent one behind another. The LIDAR sensor furthermore comprises a processor unit that is designed to select a first group from a plurality of sub-detectors and to group it to form a first macropixel, and simultaneously to select at least one second group and to group it/them to form at least one second macropixel, wherein the first macropixel and at least one of the second macropixels comprise at least one same sub-detector. In other words, at least two macropixels are formed overlapping each other in each case.

A distance between the LIDAR sensor and an object in the field of view of the LIDAR sensor can be determined, for example based on a signal propagation delay (time of flight, TOF), by means of a LIDAR sensor. The transmitting unit may be designed to emit the primary light as a punctiform beam or as a beam in the form of a line or in the form of an illumination pattern. In particular, the laser source may be designed to emit the primary light as a punctiform beam or as a beam in the form of a line or in the form of an illumination pattern. An illumination pattern may in such case have a first direction and a second direction, the first direction and the second direction being arranged orthogonally to each other, and an extent of the illumination pattern along the first direction being greater than an extent of the illumination pattern along the second direction.

The field of view of the LIDAR sensor can be scanned by means of the emitted primary light. The extent of the field of view in such case may be specified by a horizontal and a vertical scanning angle, and also by the range of the primary light. With a scanning LIDAR sensor, the primary light is emitted and received again at different scanning angles. Then an image of the surroundings can be derived from these angle-dependent individual measurements. The LIDAR sensor may furthermore comprise a deflecting unit. The emission of the primary light at different scanning angles, that is to say the deflection of the primary light into the field of view, can take place by means of the deflecting unit.

The detector unit takes the form in particular of a SPAD detector. SPAD here stands for "single photon avalanche photodiode". The SPAD detector may have what are called SPAD cells as sub-detectors. The sub-detector array takes the form in particular of a matrix. At least two sub-detectors may be designed to receive secondary light simultaneously. In particular, the sub-detectors of the sub-detector unit may be designed to all receive secondary light simultaneously. The detector unit may be designed to detect the received secondary light. The processor unit may be designed to process detected secondary light. The selecting of a first group from a plurality of sub-detectors and the grouping to form a first macropixel and the simultaneous selecting of a second group from the plurality of sub-detectors and the grouping to form a second macropixel can also be referred to as "linking" of the sub-detectors. In other words, a processor unit may for example be designed to link a plurality of SPAD cells of a SPAD detector. The processor unit may include a processing circuit that may preferably be configured as an application-specific integrated circuit (ASIC), a field programmable gate array (FPGA), processor, digital signal processor, microcontroller, or similar. The processor unit may be connected for information transfer to an internal and/or external memory unit. The processor unit may furthermore be designed to drive the laser source, e.g., for emitting a pulsed primary light. The processor unit may furthermore be designed to evaluate processed secondary light. The result of an evaluation may be used for example for a driver-assist function of a vehicle. The result of the evaluation may be used for example for a control of an autonomously driving vehicle. The LIDAR sensor may be designed in particular for use in an at least partially autonomously driving vehicle. With the LIDAR sensor, partially autonomous or autonomous driving of vehicles on freeways and in urban traffic can be implemented.

The advantage of the present invention is that the range of the LIDAR sensor can be increased. In particular, the range can be increased considerably for particular scenarios of the LIDAR sensor. For example, objects of low height and width can be readily detected even at a greater distance. Such smaller objects are in particular smaller than for example another vehicle at the same distance from the LIDAR sensor. For example, lost pieces of freight can be readily detected at a greater distance on a roadway. Such objects can be located with greater accuracy. As a result, a greater range of the LIDAR sensor for such objects can be obtained. Simultaneously, the volume of data above all with respect to the detected secondary light can nevertheless be kept small.

In one advantageous configuration of the present invention, the at least one second macropixel can be grouped along the first direction of extent and/or along the second direction of extent relative, displaced from the first macropixel. An advantage of this configuration is that it is possible to prevent unnecessarily large amounts of disturbing ambient light from adversely affecting the measurement of the LIDAR sensor.

In one further advantageous configuration of the present invention, the at least one second macropixel can be grouped displaced by precisely one sub-detector relative to the first macropixel. The advantage of this configuration is that it can be guaranteed that not only a single point but at least two points of an object are detected. This makes better verification of the object possible.

The present invention furthermore relates to a method for a LIDAR sensor for detecting an object in a field of view of the LIDAR sensor. In accordance with an example embodiment of the present invention, the method includes the following steps: generating and emitting primary light into the field of view by means of a transmitting unit including at least one laser source; receiving secondary light that has been reflected and/or scattered in the field of view by an object, by means of a receiving unit including at least one detector unit, wherein the detector unit comprises a sub-detector array including a plurality of sub-detectors arranged in a first direction of extent next to each other and/or in a second direction of extent one behind another; selecting a first group of sub-detectors from a plurality of sub-detectors, and grouping this first group to form a first macropixel by means of a processor unit, and simultaneously selecting at least one second group of sub-detectors from the plurality of sub-detectors and grouping this at least one second group to form at least one second macropixel by means of the processor unit, wherein the first macropixel and at least one of the second macropixels comprise at least one same sub-detector; evaluating the first and the at least one second macropixel; and detecting at least one object in the field of view with the aid of at least the first evaluated macropixel.

In one advantageous configuration of the present invention, the detection of the at least one object takes place additionally with the aid of the at least one second evaluated macropixel. The advantage of this configuration is that the probability of detecting an object can be increased. Owing to the first macropixel and at least one of the second macropixels comprising at least one same sub-detector, the evaluation can be substantially more precise. A small object in a larger range can be detected with greater probability in at least the first macropixel or the at least one second macropixel.

In one further advantageous configuration of the present invention, the detection of the at least one object takes place additionally with the aid of the at least one second evaluated macropixel only when no object is detectable with the aid of the first evaluated macropixel. In other words, it is possible to use the data of the at least one second macropixel for detection only when no object is detectable with the aid of the first evaluated macropixel. If on the other hand an object is detectable already with the aid of the first evaluated macropixel, the data of the at least one second macropixel for the detection of the object can be discarded. The advantage of this configuration is that the volume of data can be kept low.

In one further advantageous configuration of the present invention, the detection of the at least one object takes place with the aid of a macropixel selected according to a specifiable criterion. The selected macropixel in such case may be the first macropixel or an at least second macropixel. In other words, it is possible to use the data only of one selected macropixel for detecting if an object is detectable with the aid of at least two macropixels. In this case for example only that macropixel for which the best signal-to-noise ratio of the secondary light received occurs is selected. The specified criterion may therefore be a signal-to-noise ratio. The specified criterion may be in particular an amplitude of the received secondary light in each macropixel available for selection. The advantage of this configuration is that the volume of data can be kept low.

In one further advantageous configuration of the present invention, the information that it is a selected macropixel is transmitted to a processor unit of the LIDAR sensor. In particular, the information that an object would likewise be detectable with the aid of the non-selected macropixel is transmitted to the processor unit. The advantage of this configuration is that upon detecting the object conclusions about its size are possible. In the case of a larger object, it may be possible to select from a larger number of macropixels by means of which an object is detectable than for a smaller object.

In one advantageous configuration of the present invention, the at least one second macropixel is grouped displaced along the first direction of extent and/or along the second direction of extent relative to the first macropixel.

In one advantageous configuration of the present invention, the at least one second macropixel is grouped displaced by precisely one sub-detector relative to the first macropixel.

The present invention furthermore starts from a computer program that is set up to perform all the steps of the method described above.

The present invention furthermore starts from a machine-readable storage medium on which the computer program described above is stored.

BRIEF DESCRIPTION OF THE DRAWINGS

Embodiments of the present invention will be discussed in greater detail below with the aid of the figures. Identical reference numerals in the figures designate identical elements or elements having the same effect.

DETAILED DESCRIPTION OF EXAMPLE EMBODIMENTS

Figure 1:
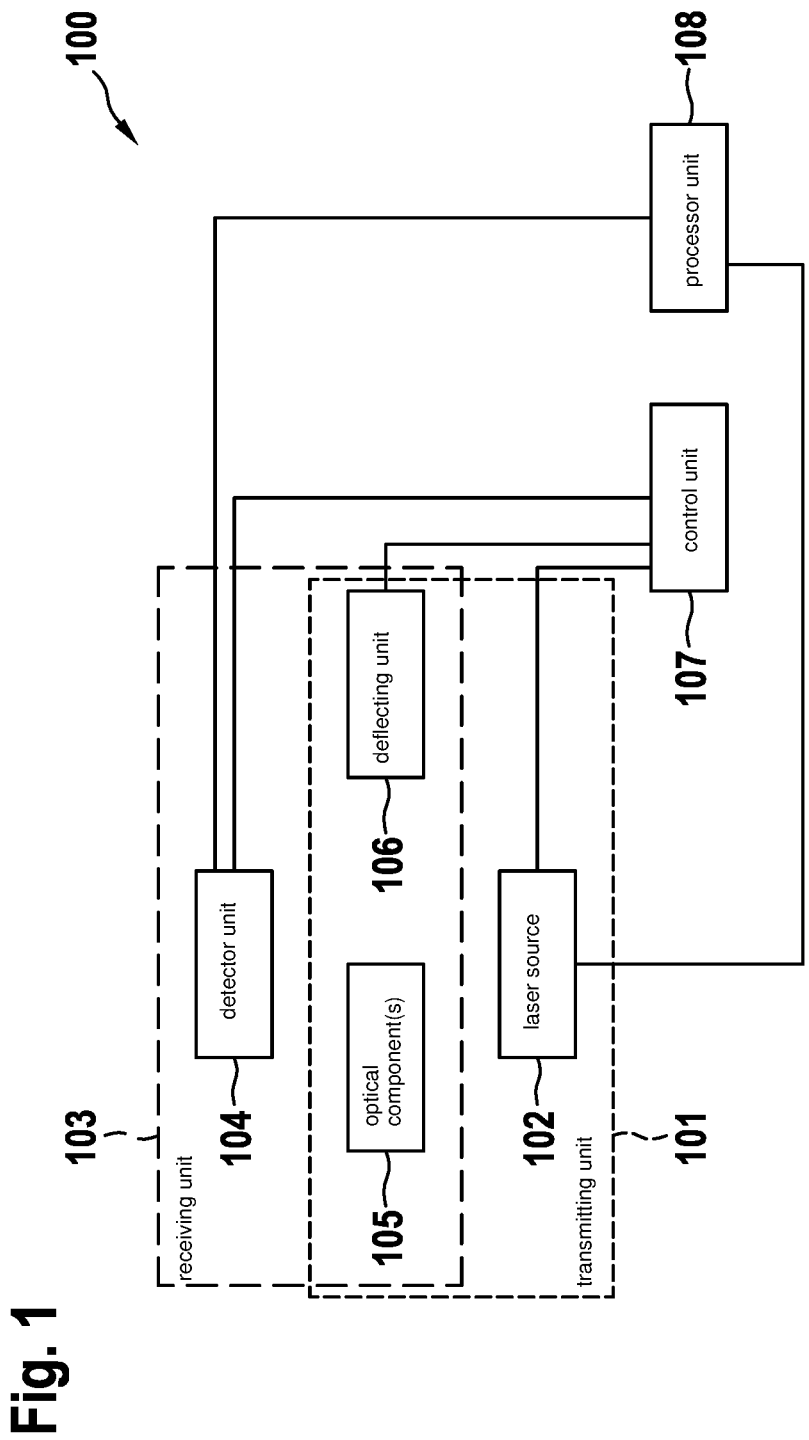
FIG. 1 shows an embodiment of a LIDAR sensor.

FIG. 1 shows as an embodiment the LIDAR sensor 100 for detecting an object in a field of view of the LIDAR sensor 100. The LIDAR sensor 100 includes the transmitting unit 101 with the laser source 102 for generating and emitting primary light into the field of view. The LIDAR sensor 100 furthermore includes the receiving unit 103 with the detector unit 104 for receiving secondary light that has been reflected and/or scattered in the field of view by an object. The detector unit 104 comprises a sub-detector array in the form of a matrix, the structure and mode of operation of which will be discussed in greater detail by way of example in FIGS. 2-4. The LIDAR sensor 100 furthermore includes a processor unit 108 that is designed to select a first group from a plurality of sub-detectors of the sub-detector array and to group it to form a first macropixel, and simultaneously to select at least one second group and to group it/them to form at least one second macropixel, wherein the first macropixel and at least one of the second macropixels comprise at least one same sub-detector. This too will be discussed in greater detail in the description of FIGS. 2-4.

The transmitting unit 101 may furthermore include at least one optical component 105. An optical component 105 may be for example a refractive optical element, a diffractive optical element or a mirror. The transmitting unit 101 may furthermore include a deflecting unit 106. The deflecting unit 106 can make it possible to scan the field of view of the LIDAR sensor 100. The receiving unit 103 may furthermore include at least one optical component 105. The receiving unit 103 may furthermore include a deflecting unit 106. The transmitting unit 101 and the receiving unit 103 in the example shown include the same optical component 105 and the same deflecting unit 106. Alternatively, and not shown here, the transmitting unit 101 may include an optical component 105 that differs from a second optical component 105 of the receiving unit 103. Alternatively, and not shown here, the transmitting unit 101 may include a deflecting unit 106 that differs from a second deflecting unit 106 of the receiving unit 103.

The LIDAR sensor 100 may furthermore include the control unit 107. The control unit 107 may be designed to drive the laser source 102. The control unit 107 may be designed to drive the detector unit 104. The control unit 107 may be designed to drive the deflecting unit 106. The processor unit 108 may be connected to the control unit 107. The processor unit 108 and the control unit 107 may also be formed jointly as a processor unit. Thus the processor unit may also be designed to drive the laser source, e.g. for emitting a pulsed primary light. The processor unit 108 may furthermore be designed to evaluate processed secondary light.

Figure 2:
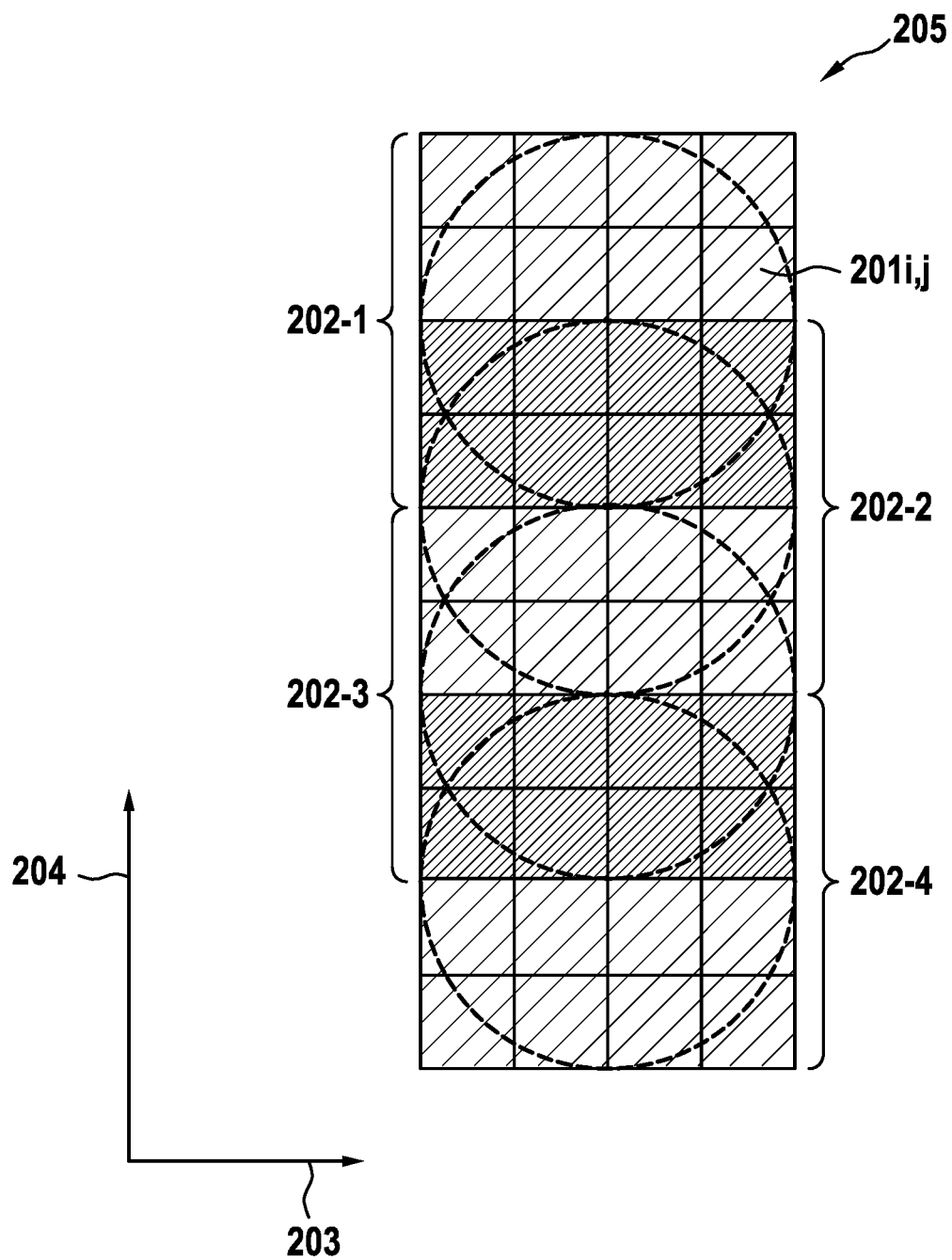
FIG. 2 shows a first example embodiment of the selection and grouping of sub-detectors to form macropixels, in accordance with the present invention.

FIG. 2 shows a first embodiment of the selection and grouping of sub-detectors to form macropixels. A sub-detector array 205 in the form of a matrix is shown, as is used for example in a detector unit 104 of FIG. 1. The detector unit 104 in this case takes the form in particular of a SPAD detector. The sub-detectors 201$i, j$ may in this case take the form of SPAD cells. The sub-detector array 205 takes the form of a matrix and comprises a plurality of sub-detectors 201$i, j$. In a first direction of extent 203, four sub-detectors 201($i$=1-4) in each case are arranged next to each other, and in a second direction of extent 204 ten sub-detectors 201($j$=1-10) in each case are arranged one behind another. The index i designates the number of a sub-detector along the first direction of extent 203, and the index j designates the number of a sub-detector along the second direction of extent 204.

The processor unit 108 of the LIDAR sensor 100 shown by way of example in FIG. 1 is designed to select a first group from the sub-detectors 201$i, j$ and to group it to form a first macropixel 202-1. The first macropixel 202-1 in the example shown comprises the sub-detectors 201 (1, 1) through 201 (4, 4). For better clarification, these 16 upper sub-detectors 201$i, j$ have been additionally ringed with the top dotted circle. In another embodiment, a macropixel could also comprise a number of sub-detectors 201$i, j$ different from 16. The processor unit 108 is furthermore designed to select from the sub-detectors 201$i, j$ simultaneously at least one second group and to group it/them to form at least one second macropixel. In the example shown in FIG. 2, these are the further macropixels: 202-2, which comprises the sub-detectors 201 (1, 3) through 201 (4, 6), that are ringed with the second dotted circle from the top; 202-3, which comprises the sub-detectors 201 (1, 5) through 201 (4, 8), that are ringed with the third dotted circle from the top; and 202-4, which comprises the sub-detectors 201 (1, 7) through 201 (4, 10), that are ringed with the fourth dotted circle from the top. Two of the macropixels 202-1 through 202-4 shown here in such case always comprise at least one same sub-detector 201$i, j$. Thus for example the macropixel 202-1 and the macropixel 202-2 both comprise the sub-detectors 201 (1, 3) through 201 (4, 4). The macropixel 202-2 and the macropixel 202-3 both comprise the sub-detectors 201 (1, 5) through 201 (4, 6). The macropixel 202-3 and the macropixel 202-4 both comprise the sub-detectors 201 (1, 7) through 201 (4, 8). In other words, at least two of the macropixels 202-1 through 202-4 are formed overlapping each other in each case. For each of the macropixels 202-1 through 202-4, a histogram can be generated and evaluated by means of the processor unit 108.

Due to the processor unit 108 being designed to group sub-detectors 201$i, j$ to form macropixels 202-1 through 202-4 in the manner just described, smaller objects in larger ranges, that is to say at a greater distance from the LIDAR sensor 100, can also be detected by means of the LIDAR sensor 100. It is possible to avoid unnecessarily large amounts of disturbing ambient light adversely affecting the measurement. If the processor unit 108 were merely designed to group sub-detectors 201$i, j$ to form macropixels that do not comprise at least one same sub-detector 201$i, j$, the detection of smaller objects in larger ranges would be made substantially more difficult or not be possible at all. If the processor unit 108 were for example merely designed to group sub-detectors 201$i, j$ to form the macropixels 202-1 and 202-3, the probability would be high that in particular a small object in a larger range would only be half detected or not be detected at all by such a macropixel. If the processor unit 108 were for example merely designed to group sub-detectors 201$i, j$ to form smaller macropixels (for example a first macropixel from the sub-detectors 201 (1, 1) through 201 (4, 2), a second macropixel from the sub-detectors 201 (1, 3) through 201 (4, 4) etc.), detection of smaller objects might be possible, but only at a shorter distance from the LIDAR sensor 100 than by means of the possibility of macropixel formation described by way of example in FIG. 2.

According to the example of FIG. 2, the macropixels can be grouped displaced along the second direction of extent 204. For example, the second macropixel 202-2 can be grouped displaced along the direction of extent 204 relative to the first macropixel 202-1. The same applies to the further two macropixels 202-3 and 202-4.

Figure 3:
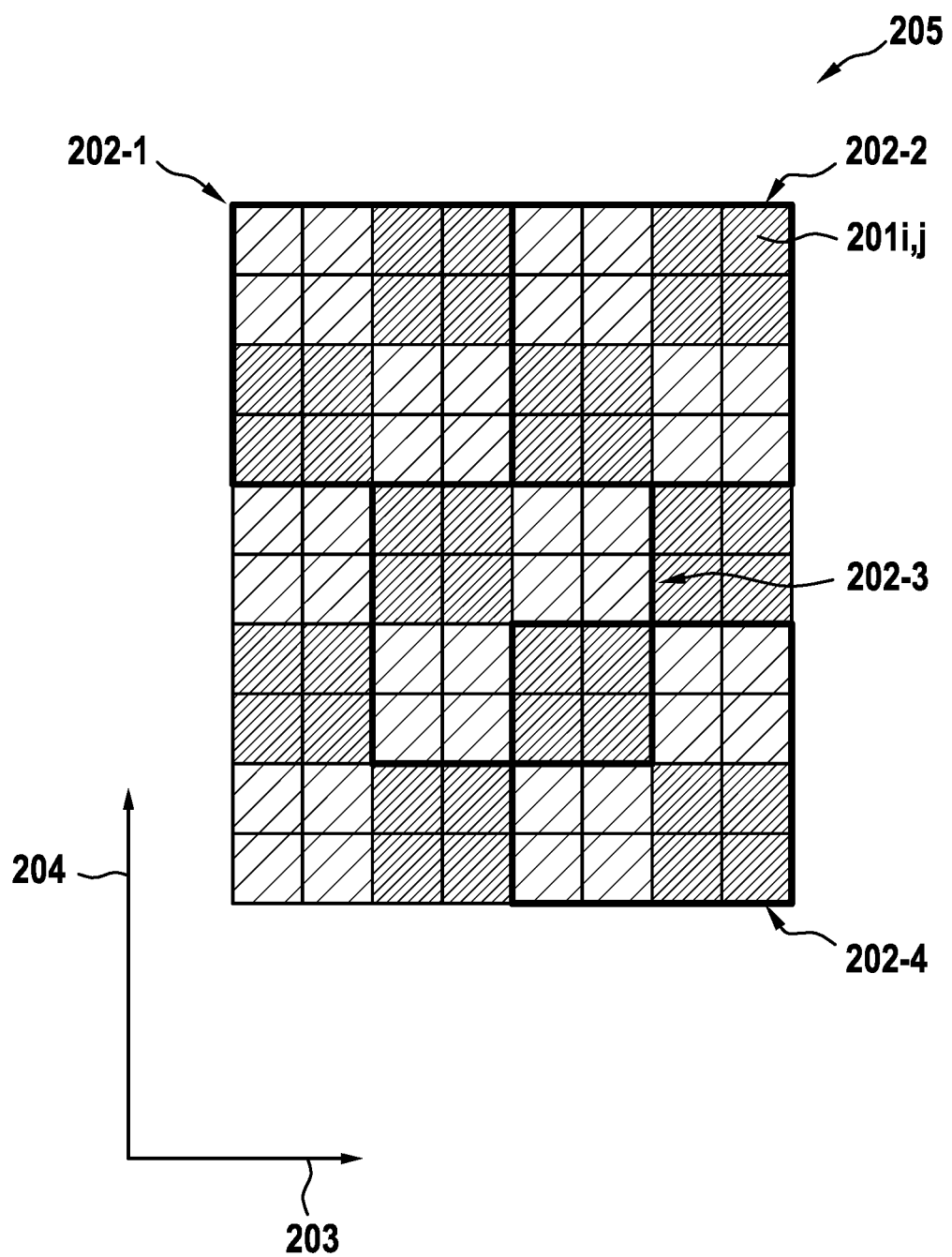
FIG. 3 shows a second example embodiment of the selection and grouping of sub-detectors to form macropixels, in accordance with the present invention.

FIG. 3 shows a second embodiment of the selection and grouping of sub-detectors 201$i, j$ to form macropixels 202-1 through 202-4. A further example of a sub-detector array 205 in the form of a matrix is shown, as is used for example in a detector unit 104 of FIG. 1. The sub-detector array 205 takes the form of a matrix and comprises a plurality of sub-detectors 201$i, j$. The sub-detectors 201$i, j$ may take the form of SPAD cells in this example too. In a first direction of extent 203, eight sub-detectors 201($i$=1-8) in each case are arranged next to each other, and in a second direction of extent 204 ten sub-detectors 201($j$=1-10) in each case are arranged one behind another. The index i again designates the number of a sub-detector along the first direction of extent 203, and the index j again designates the number of a sub-detector along the second direction of extent 204.

The processor unit 108 of the LIDAR sensor 100 shown by way of example in FIG. 1 is designed to select a first group from the sub-detectors 201i, j of the sub-detector array 205 shown in FIG. 3 and to group it to form a first macropixel 202-1. The processor unit 108 is furthermore designed to select at least one second group simultaneously from the sub-detectors 201i, j and to group it/them to form at least one second macropixel group 202-2 through 202-4. The macropixels 202-1 through 202-4 in FIG. 3 comprise 16 sub-detectors 201i, j in each case that are outlined more thickly for clarification. The first macropixel 202-1 comprises for example the 16 outlined sub-detectors 201i, j in the upper left-hand region of the sub-detector array 205, the second macropixel 202-2 the 16 outlined sub-detectors 201i, j in the upper right-hand region of the sub-detector array 205, the third macropixel 202-3 the 16 outlined sub-detectors 201i, j in a middle, lower region of the sub-detector array 205, and the fourth macropixel 202-4 the 16 outlined sub-detectors 201i, j in the lower right-hand region of the sub-detector array 205. In another embodiment, a macropixel could also comprise a number of sub-detectors 201i, j different from 16.

The macropixels 202-1 through 202-4 shown in FIG. 3 in such case represent arbitrarily selected examples of possible macropixels. The processor unit 108 may be designed to select still further groups from the sub-detectors 201i, j of the sub-detector array 205 shown in FIG. 3 and to group them to form further macropixels 202-n. However, for clarity not all possibilities have been illustrated. Again, at least a first macropixel and a second macropixel comprise at least one same sub-detector 201i, j. In FIG. 3 this becomes clear by way of example for the macropixels 202-3 and 202-4. In other words, here too at least two of the macropixels 202-1 through 202-4 are formed overlapping each other in each case. For each of the macropixels 202-1 through 202-4, a histogram can be generated and evaluated by means of the processor unit 108.

Furthermore, it becomes clear with the aid of FIG. 3 that in this embodiment the macropixels 202-2 through 202-4 can be grouped displaced along the first direction of extent 203 and/or along the second direction of extent 204 relative to the first macropixel 202-1. Thus for example macropixel 202-2 can be grouped displaced along the first direction of extent 203 relative to the first macropixel 202-1. The macropixels 202-3 and 202-4 shown by way of example can be grouped displaced along the first direction of extent 203 and along the second direction of extent 204 relative to the first macropixel 202-1. Owing to the grouping along the first direction of extent 203 and/or along the second direction of extent 204, a further improvement in the range when recognizing small objects can be achieved.

Figure 4:
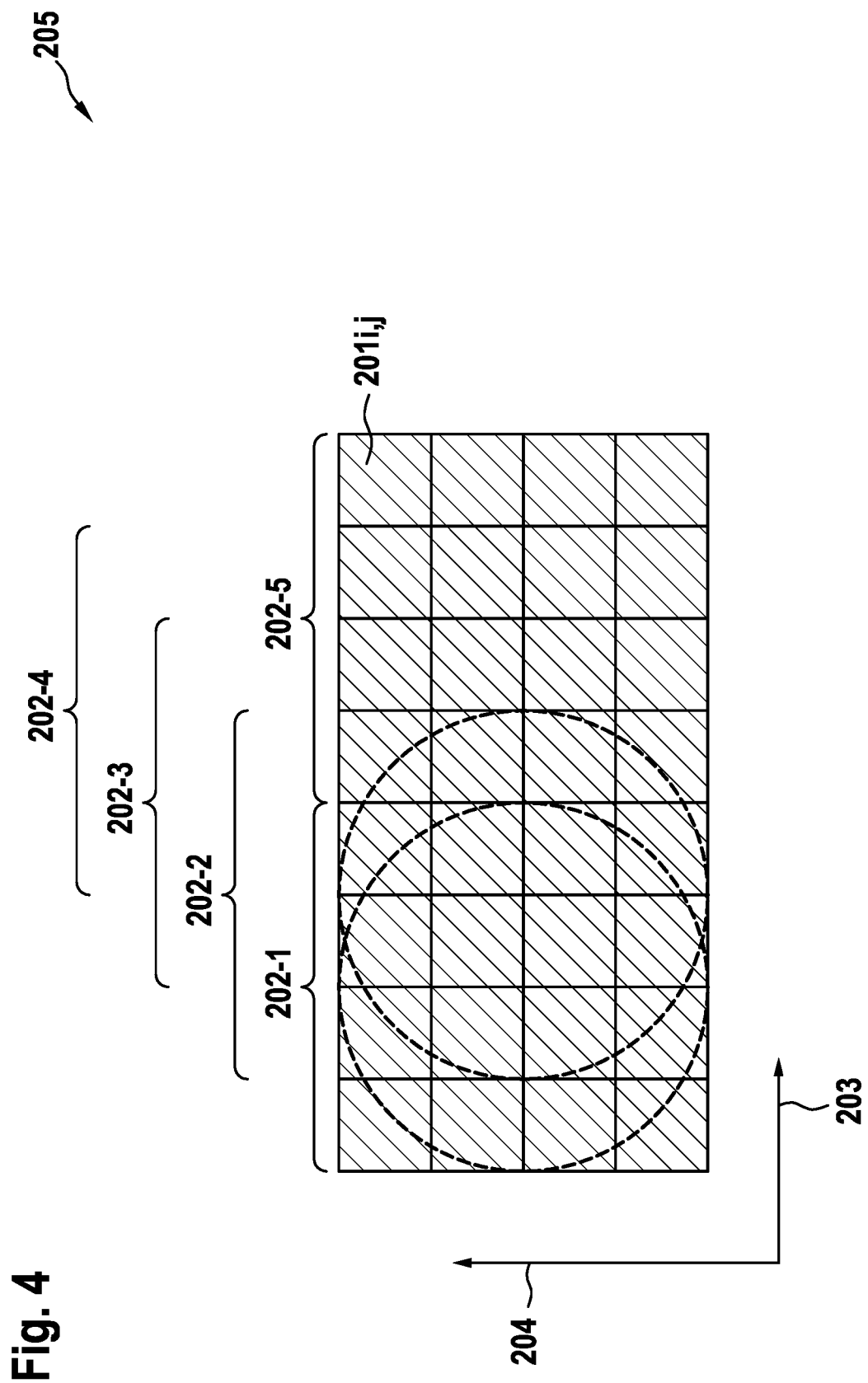
FIG. 4 shows a third example embodiment of the selection and grouping of sub-detectors to form macropixels, in accordance with the present invention.

FIG. 4 shows a third embodiment of the selection and grouping of sub-detectors 201i, j to form the macropixels 202-1 through 202-5. A further example of a sub-detector array 205 in the form of a matrix is shown, as is used for example in a detector unit 104 of FIG. 1. The sub-detector array 205 takes the form of a matrix and comprises a plurality of sub-detectors 201i, j. The sub-detectors 201i, j may take the form of SPAD cells in this example too. In a first direction of extent 203, eight sub-detectors 201(i=1–8) in each case are arranged next to each other and in a second direction of extent 204 four sub-detectors 201(j=1–4) in each case are arranged one behind another. The index i again designates the number of a sub-detector along the first direction of extent 203, and the index j again designates the number of a sub-detector along the second direction of extent 204.

The processor unit 108 of the LIDAR sensor 100 shown by way of example in FIG. 1 is designed to select a first group from the sub-detectors 201i, j and to group it to form a first macropixel 202-1. The first macropixel 202-1 in the example shown comprises the sub-detectors 201 (1, 1) through 201 (4, 4). For better clarification, these 16 sub-detectors 201i, j have been additionally ringed with the left-hand dotted circle. In another embodiment, a macropixel could also comprise a number of sub-detectors 201i, j different from 16. The processor unit 108 is furthermore designed to select from the sub-detectors 201i, j simultaneously at least one second group and to group it/them to form at least one second macropixel. In the example shown in FIG. 4, these are the further macropixels: 202-2, which comprises the sub-detectors 201 (2, 1) through 201 (5, 4), that are ringed with the second dotted circle from the left; 202-3, which comprises the sub-detectors 201 (3,1) through 201 (6,4); 202-4, which comprises the sub-detectors 201 (4, 1) through 201 (7, 4); and 202-5, which comprises the sub-detectors 201 (5, 1) through 201 (8, 4). Always at least two of the macropixels 202-1 through 202-5 shown here in such case comprise at least one same sub-detector 201i, j. Thus for example the macropixel 202-1 and the macropixel 202-2 both comprise the sub-detectors 201 (2,1) through 201 (4, 4). The macropixel 202-2 and the macropixel 202-3 both comprise the sub-detectors 201 (3,1) through 201 (5, 4). The macropixel 202-3 and the macropixel 202-4 both comprise the sub-detectors 201 (4,1) through 201 (6, 4). The macropixel 202-4 and the macropixel 202-5 both comprise the sub-detectors 201 (5, 1) through 201 (7, 4). In other words, at least two of the macropixels 202-1 through 202-5 are formed overlapping each other in each case. For each of the macropixels 202-1 through 202-5, a histogram can be generated and evaluated by means of the processor unit 108.

According to the example of FIG. 4, the macropixels can be grouped displaced along the first direction of extent 203. For example, the second macropixel 202-2 can be grouped displaced along the first direction of extent 203 relative to the first macropixel 202-1. The same applies for the further three macropixels 202-3 and 202-5. As furthermore emerges from FIG. 4 and the description just given, the second macropixel 202-2 can be grouped displaced by precisely one sub-detector 201i, j along the first direction of extent 203 relative to the first macropixel 202-1. The same applies to the third macropixel 202-3, which can be grouped displaced by precisely one sub-detector 201i, j along the first direction of extent 203 relative to the macropixel 202-2, etc. In other words, in each case one macropixel 202-n can be grouped displaced by precisely one sub-detector 201i, j along the first direction of extent 203 relative to the previous macropixel 202-(n−1). As a result, it can be guaranteed that not only a single point but at least two points of an object are detected. An object in the field of view of the LIDAR sensor can be detected with greater probability. Better verification of the object is made possible.

Figure 5:
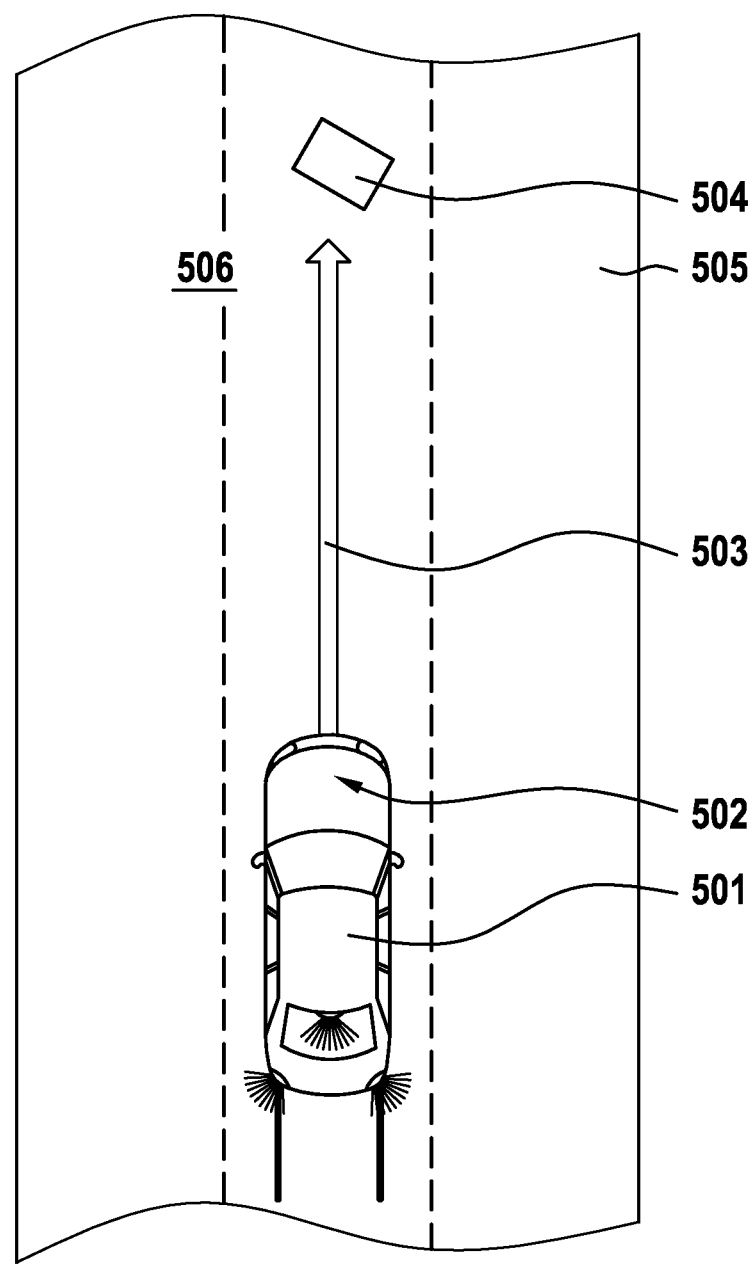
FIG. 5 shows an example of application for the LIDAR sensor for detecting an object, in accordance with the present invention.

FIG. 5 shows an example of application for the LIDAR sensor for detecting an object 504. A motor vehicle 501 is illustrated which has a LIDAR sensor 100 that is described above, but not illustrated separately here, at an installation location 502. The vehicle 501 is travelling on the roadway 505 of a road. By means of the LIDAR sensor 100, primary light 503 can be emitted into the field of view 506 of the LIDAR sensor 100. By means of a receiving unit 103 of the LIDAR sensor 100, secondary light that has been reflected and/or scattered in the field of view 506 by an object 504 can be received. The object 504 may be a small object 504 in a large range, that is to say at a great distance from the LIDAR sensor 100. The object 504 may for example be a lost piece of freight. The object 504 may possibly be made absorbing (reflectivity approx. 5%). Optionally, the roadway 505 may reflect considerably more greatly (up to 30%).

In particular in the case of the properties just described of the object 504 and the roadway 505, detection of such an object 504 by means of conventional LIDAR sensors was difficult. In such a case, the signal hitherto was only very low. This is where the present invention described above comes into play. A LIDAR sensor as described by way of example in FIG. 1, including a detector unit 104 that comprises a sub-detector array in the form of a matrix, the structure and mode of operation of which have been discussed by way of example in FIGS. 2-4, can circumvent this problem. A small object 504 can be readily detected even at a greater distance.

Figure 6:
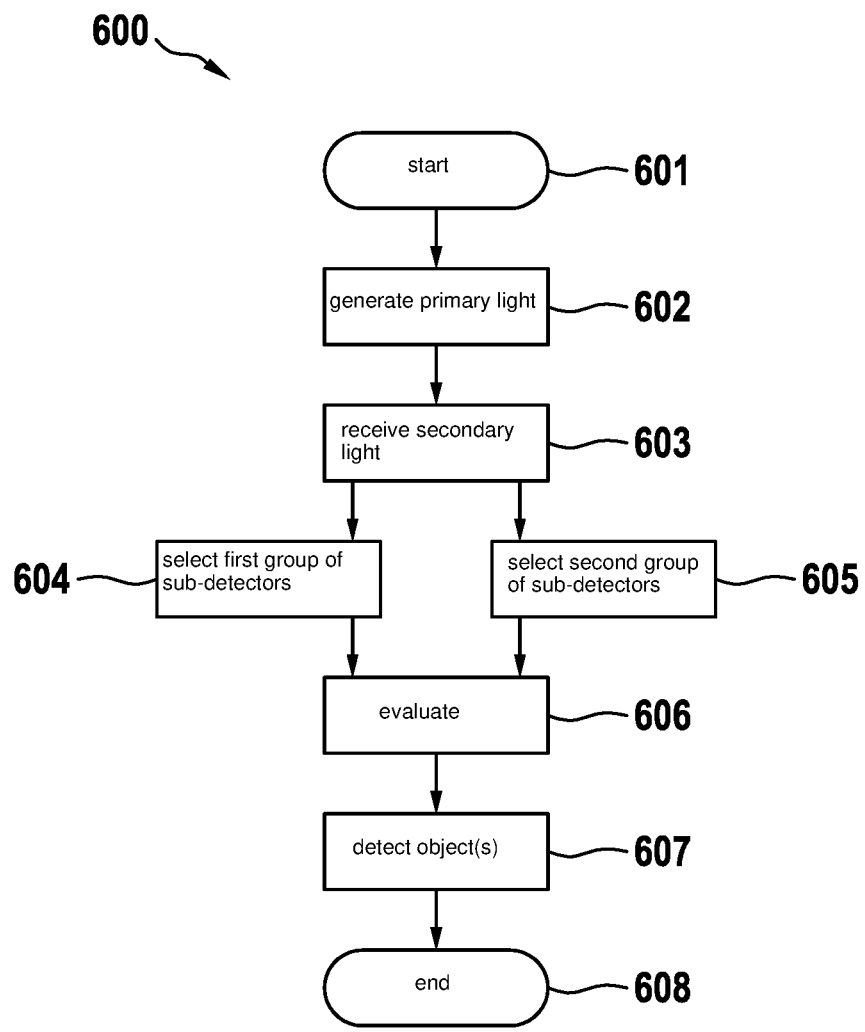
FIG. 6 shows an example embodiment for a method for the LIDAR sensor for detecting an object, in accordance with the present invention.

FIG. 6 shows as an embodiment the method 600 for a LIDAR sensor for detecting an object. The method starts in step 601.

In step 602, primary light is generated and emitted into the field of view by means of a transmitting unit of the LIDAR sensor that includes at least one laser source. In step 603, secondary light that has been reflected and/or scattered in the field of view by an object is received by means of a receiving unit that includes at least one detector unit, the detector unit comprising a sub-detector array in the form of a matrix and including a plurality of sub-detectors arranged in a first direction of extent next to each other and in a second direction of extent one behind another. In step 604, a first group of sub-detectors is selected from a plurality of sub-detectors, and this first group is grouped to form a first macropixel by means of a processor unit of the LIDAR sensor. Simultaneously, in step 605 at least one second group of sub-detectors is selected from the plurality of sub-detectors and this at least one second group is grouped to form at least one second macropixel by means of the processor unit. In such case, the first macropixel and at least one of the second macropixels comprise at least one same sub-detector. In step 606, evaluation of the first and the at least one second macropixel takes place. For each of the macropixels, a histogram can be generated and evaluated for example by means of the processor unit. In step 607, detection of at least one object in the field of view with the aid of at least the first evaluated macropixel occurs. The method 600 ends at step 608.

It may be possible that data of an object have already been evaluated in the first macropixel in step 606. Accordingly, it is possible for recognition of an object in the field of view to occur already in step 607. The detection 607 of the object in this case would have to be equated with recognition of the object in the field of view. In this case, the information from an evaluation 606 of one at least second macropixel can optionally be discarded.

Preferably the detection 607 of the at least one object takes place additionally with the aid of the at least one second evaluated macropixel. If for example no object has been recognized in the step of the detection 607 of at least one object in the field of view with the aid of at least the first evaluated macropixel, the detection 607 of the at least one object preferably takes place additionally with the aid of the at least one second evaluated macropixel. In this case, the information from an evaluation 606 of one at least second macropixel would not be discarded, but taken into account.

In order however not to increase unnecessarily a volume of data to be processed, the detection 607 of the at least one object preferably takes place additionally with the aid of the at least one second evaluated macropixel only when no object is detectable with the aid of the first evaluated macropixel.

With reference to the specific embodiment of the sub-detector array 205 illustrated in FIG. 2, the method 600 would operate by way of example as follows: by means of the processor unit, in steps 604 and 605, as already discussed for FIG. 2, the macropixels 202-1 through 202-4 are selected and grouped. In such case, a second macropixel is grouped displaced along the second direction of extent 204 relative to the previous macropixel in each case. (Analogously, it can be recognized with the aid of FIGS. 3 and 4 that in steps 604 and 605 at least one second macropixel can also be grouped displaced along the first direction of extent 203 and/or along the second direction of extent 204 relative to the first macropixel.) In step 606 the macropixels 202-1 through 202-4 are evaluated. For this, the signals of the secondary light that were detected by means of the sub-detectors 201*i*, *j* of the detector unit can be processed. If data of an object are evaluated already for macropixel 202-1 in step 606, recognition of an object in the field of view may already occur in step 607 with the aid of this data from macropixel 202-1. The information from the evaluation 606 of the macropixel 202-2 can be discarded. If however in step 607 for example no object is recognized with the aid of the evaluated macropixel 202-1 however, the information from an evaluation 606 of the macropixel 202-2 would not be discarded but taken into account. The detection 607 of the at least one object can take place additionally with the aid of the macropixel 202-2.

With reference to the specific embodiment of the sub-detector array 205 illustrated in FIG. 4, it can be recognized that in steps 604 and 605 the at least one second macropixel can be grouped displaced for example by precisely one sub-detector relative to the first macropixel. As a result, it can be guaranteed that not only a single point but at least two points of an object are detected. In order in this case however to avoid an unnecessarily large amount of histograms, for which a large amount of computing power would be necessary, secondary light that has been reflected and/or scattered in a specified focus range of the LIDAR sensor is preferably selected for the evaluation 606 of the first and the at least one second macropixel. The focus range in such case lies in particular in the range of 90 through 120 m. At this distance, that is to say in this range, the scenarios mentioned above are most likely to occur. At this distance, the recognition of smaller objects, such as for example lost pieces of freight, by means of conventional LIDAR sensors was particularly difficult. By means of the method 600 described here, detection of such objects is now made possible. In such case, preferably those macropixels for which data of an object had already been evaluated in step 606 are selected. In step 607, recognition of an object in the field of view may occur with the aid of these data from these selected macropixels. Particularly preferably, in such case precisely two macropixels for which data of an object had already been evaluated in step 606 are selected. In particular, these are two macropixels in which half of the secondary light is received by means of the one macropixel and the other half of the secondary light by means of the other macropixel. Alternatively, a maximum signal can be ascertained in the histograms for specified sub-detector distances. This too can ensure a maximum range.

What is claimed is:

1. A LIDAR sensor for detecting at least one object in a field of view of the LIDAR sensor, the LIDAR sensor comprising:

a transmitting unit including at least one laser source configured to generate and emit primary light into the field of view;

a receiving unit including at least one detector unit configured to receive secondary light that has been reflected and/or scattered in the field of view by an object, the detector unit including a sub-detector array including a plurality of sub-detectors arranged in a first direction of extent next to each other and/or in a second direction of extent one behind another; and a processor unit configured to select a first group from a plurality of subdetectors and to group the first group to form a first macropixel, simultaneously to select at least one second group and to group the at least one second group to form at least one second macropixel, wherein the first macropixel and at least one of the second macropixels include at least one same sub-detector, and to evaluate the first macropixel and the at least one second macropixel, wherein the detection of the at least one object takes place additionally using the evaluated at least one second macropixel, and wherein the detection of the at least one object takes place additionally using the evaluated at least one second macropixel only when no object is detectable using the evaluated first macropixel.

2. The LIDAR sensor as recited in claim 1, wherein the at least one second macropixel is grouped displaced along the first direction of extent and/or along the second direction of extent, relative to the first macropixel.

3. The LIDAR sensor as recited in claim 2, wherein the at least one second macropixel is grouped displaced by precisely one sub-detector relative to the first macropixel.

4. A method for a LIDAR sensor for detecting an object in a field of view of the LIDAR sensor, comprising the following steps:

generating and emitting primary light into the field using a transmitting unit including at least one laser source;

receiving secondary light that has been reflected and/or scattered in the field of view by an object, using a receiving unit including at least one detector unit, wherein the detector unit includes a sub-detector array including a plurality of subdetectors arranged in a first direction of extent next to each other and/or in a second direction of extent one behind another;

selecting a first group of sub-detectors from a plurality of sub-detectors, and grouping the first group to form a first macropixel using a processor unit, and simultaneously selecting at least one second group of sub-detectors from the plurality of sub-detectors and grouping the at least one second group to form at least one second macropixel using the processor unit, wherein the first macropixel and at least one of the at least one second macropixel including at least one same sub-detector;

evaluating the first macropixel and the at least one second macropixel; and detecting at least one object in the field of view using at least the evaluated first macropixel, wherein the detection of the at least one object takes place additionally using the evaluated at least one second macropixel, and wherein the detection of the at least one object takes place additionally using the evaluated at least one second macropixel only when no object is detectable using the evaluated first macropixel.

5. The method as recited in claim 4, wherein the detection of the at least one object takes place using a macropixel selected according to a specifiable criterion.

6. The method as recited in claim 4, wherein the at least one second macropixel is grouped displaced along the first direction of extent and/or along the second direction of extent, relative to the first macropixel.

7. The method as recited in claim 6, wherein the at least one second macropixel is grouped displaced by precisely one sub-detector relative to the first macropixel.

8. A non-transitory machine-readable storage medium on which is stored a computer program for a LIDAR sensor for detecting an object in a field of view of the LIDAR sensor, the computer program, when executed by a computer, causing the computer to perform the following steps:

generating and emitting primary light into the field using a transmitting unit including at least one laser source;

receiving secondary light that has been reflected and/or scattered in the field of view by an object, using a receiving unit including at least one detector unit, wherein the detector unit includes a sub-detector array including a plurality of subdetectors arranged in a first direction of extent next to each other and/or in a second direction of extent one behind another;

selecting a first group of sub-detectors from a plurality of sub-detectors, and grouping the first group to form a first macropixel using a processor unit, and simultaneously selecting at least one second group of sub-detectors from the plurality of sub-detectors and grouping the at least one second group to form at least one second macropixel using the processor unit, wherein the first macropixel and at least one of the at least one second macropixel including at least one same sub-detector;

evaluating the first macropixel and the at least one second macropixel; and detecting at least one object in the field of view using at least the evaluated first macropixel, wherein the detection of the at least one object takes place additionally using the evaluated at least one second macropixel, and wherein the detection of the at least one object takes place additionally using the evaluated at least one second macropixel only when no object is detectable using the evaluated first macropixel.

* * * * *